United States Patent
Baus et al.

(10) Patent No.: US 11,269,081 B2
(45) Date of Patent: Mar. 8, 2022

(54) METHOD AND APPARATUS FOR DETERMINING THE ABSOLUTE POSITION OF A MOTOR VEHICLE, LOCALIZATION SYSTEM, MOTOR VEHICLE

(71) Applicant: Robert Bosch GmbH, Stuttgart (DE)

(72) Inventors: Michael Baus, Bietigheim-Bissingen (DE); Martin Kossira, Marbach Am Neckar (DE); Sebastian Roith, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 306 days.

(21) Appl. No.: 16/320,749

(22) PCT Filed: Jul. 6, 2017

(86) PCT No.: PCT/EP2017/066946
§ 371 (c)(1),
(2) Date: Jan. 25, 2019

(87) PCT Pub. No.: WO2018/019539
PCT Pub. Date: Feb. 1, 2018

(65) Prior Publication Data
US 2019/0162861 A1    May 30, 2019

(30) Foreign Application Priority Data
Jul. 28, 2016    (DE) ............... 10 2016 213 893.6

(51) Int. Cl.
*G01S 19/47*    (2010.01)
*G01C 21/16*    (2006.01)
*G01C 21/28*    (2006.01)

(52) U.S. Cl.
CPC ............ *G01S 19/47* (2013.01); *G01C 21/165* (2013.01); *G01C 21/28* (2013.01)

(58) Field of Classification Search
CPC ........ G01S 19/47; G01C 21/165; G01C 21/28
See application file for complete search history.

(56) References Cited

U.S. PATENT DOCUMENTS 9,020,757 B2 *   4/2015   Peake ................. B62D 6/00
                                                                            701/500
9,121,929 B2 *   9/2015   Okamura ............... G01S 19/49
(Continued)

FOREIGN PATENT DOCUMENTS

DE    10 2012 224 107 A1    6/2014
JP        2008-170278 A       7/2008
(Continued)

OTHER PUBLICATIONS

International Search Report corresponding to PCT Application No. PCT/EP2017/066946, dated Sep. 15, 2017 (German and English language document) (5 pages).

*Primary Examiner* — Hussein Elchanti
(74) *Attorney, Agent, or Firm* — Maginot, Moore & Beck LLP

(57) ABSTRACT

A method for determining the absolute position of a motor vehicle in a global coordinate system, includes capturing a first position with a satellite-based navigation system and calculating a second position with at least one inertial sensor and integrating the measured values thereof. The absolute position of the motor vehicle is determined on the basis of the first position and the second position with the aid of a fusion filter. Provision is made for an error in the currently determined second position to be determined on the basis of a comparison of the first position captured last with an associated second position and to be taken into account when determining the current second position.

8 Claims, 2 Drawing Sheets

(56) References Cited

U.S. PATENT DOCUMENTS

| | | |
|---|---|---|
| 2006/0287824 A1 | 12/2006 | Lin |
| 2008/0100386 A1 | 5/2008 | Wicpalek et al. |
| 2008/0249692 A1* | 10/2008 | Dix .................. G01C 21/00 701/50 |
| 2010/0019963 A1 | 1/2010 | Gao et al. |
| 2016/0018821 A1* | 1/2016 | Akita ................ G05D 1/0022 701/2 |
| 2016/0167702 A1* | 6/2016 | Morimoto ........... B62D 15/025 701/41 |
| 2016/0209236 A1* | 7/2016 | Steinhardt ........... G01C 21/165 |
| 2017/0113696 A1* | 4/2017 | Oh .................... G06K 9/00798 |
| 2017/0122754 A1* | 5/2017 | Konishi ......... B60W 30/18154 |
| 2017/0235313 A1* | 8/2017 | Sakamoto ............ B60W 30/12 701/41 |
| 2017/0349209 A1* | 12/2017 | Kloess ................. B62D 6/002 |
| 2018/0009437 A1* | 1/2018 | Ooba .................. B60W 30/12 |

FOREIGN PATENT DOCUMENTS

| | | |
|---|---|---|
| JP | 2008-211801 A | 9/2008 |
| JP | 2012-007939 A | 1/2012 |
| JP | 2012-215491 A | 11/2012 |
| JP | 2013-061320 A | 4/2013 |
| JP | 2015-118059 A | 6/2015 |
| JP | 2016-505831 A | 2/2016 |

* cited by examiner

A:
```
10:  TMP = v_k · (t_k - t_{k-1})
20:  IF |TMP| >= M/2 THEN error
30:  pr_k = pr_{k-1} + TMP
40:  IF (pr_k > P_max) THEN
50:     pr_k = pr_k - P_max
60:     ps_k = ps_{k-1} + P_max
70:  ELSEIF (pr_k < 0) THEN
80:     pr_k = pr_k + P_max
90:     ps_k = ps_{k-1} - P_max
100: ELSE
110:    ps_k = ps_{k-1}
120: ENDIF
130: IF exists(p_k) THEN
140:    ps_k = p_k - pr_k
150: ENDIF
```

B:
```
10:  po_k = pr_k - ps_k
20:  TMP = 0
30:  FOR p = k0+1 TO k
40:     dpr = pr_p - pr_{p-1}
50:     IF (dpr >= P_max/2) THEN
60:        TMP = TMP + P_max
70:     ELSEIF (dpr < -P_max/2)
80:        TMP = TMP + P_max
90:     END
100: END
110: pokk_k = pr_k + TMP + ps_k0
```

Fig. 4

METHOD AND APPARATUS FOR DETERMINING THE ABSOLUTE POSITION OF A MOTOR VEHICLE, LOCALIZATION SYSTEM, MOTOR VEHICLE

This application is a 35 U.S.C. § 371 National Stage Application of PCT/EP2017/066946, filed on Jul. 6, 2017, which claims the benefit of priority to Serial No. DE 10 2016 213 893.6, filed on Jul. 28, 2016 in Germany, the disclosures of which are incorporated herein by reference in their entirety.

The disclosure relates to a method for determining the absolute position of a motor vehicle in a global coordinate system, wherein a first position is recorded by means of a satellite-assisted navigation system, wherein a second position is calculated by means of at least one inertial sensor and integration of its measured values, and wherein the first position and the second position are taken as a basis for ascertaining the absolute position of the motor vehicle using a fusion filter.

Furthermore, the disclosure relates to an apparatus for performing the method, to a location determination system having such an apparatus and to a motor vehicle having such a location determination system.

BACKGROUND

For the purpose of determining the absolute position of a motor vehicle, it is known practice to determine said absolute position by using two different systems. Firstly, a satellite-assisted navigation system is used to establish the position of a motor vehicle in a global coordinate system. As the satellite-assisted navigation system cannot deliver reliable data at any time, however, for example if the motor vehicle is in a tunnel, it is additionally known practice to evaluate the measured values of at least one inertial sensor in order to take the movement of the motor vehicle recorded by means of the inertial sensor as a basis for calculating the current position of the motor vehicle. It is known that the positions recorded by these two systems are compared with or offset against one another by means of a fusion filter in order to determine the absolute position of the motor vehicle.

What can happen in this instance is that the absolute position jumps unexpectedly. The reason for this is that, when the second position is calculated on the basis of the measured values of the inertial sensor, measurement errors mean that the calculated second position does not have to correspond to the actual position. The measurement errors can add up in this instance, resulting in the second position deviating from the absolute position to ever greater extent. As soon as a first position is then recordable again, the absolute position jumps to the first position recorded by means of the navigation system. This can result firstly in irritations for the driver and secondly also in problems with assistance systems in the motor vehicle that operate on the basis of the absolute position of the motor vehicle.

SUMMARY

The method according to disclosure has the advantage that steady signal values or a steady absolute position of the motor vehicle is determined, with steady, continuous and bounded calculation of the second position of the motor vehicle being effected. According to the disclosure, this is achieved by virtue of an error in the current determined second position being determined on the basis of a comparison of the most recently recorded first position with an associated calculated second position and taken into consideration for determining the current second position. Thus, the most recently recorded error is taken as a starting point for correcting or compensating for the determination of the current second position, so that the total error ends up smaller or declines, and that in this respect the risk of a jump in the absolute position is decreased or prevented.

According to a preferred development of the disclosure, there is provision for the error determined to be the difference between the most recently recorded first position and the associated second position. As a result, an error is ascertained and an estimate of the correct second position is optimized in a simple manner.

Furthermore, there is preferably provision for the associated second position chosen to be the second position that was ascertained at the same time as the most recently recorded first position. This ensures that the error is kept as small as possible and that the correct values are compared with one another in order to optimize the determination of the absolute position and in particular to prevent jumping.

According to a preferred embodiment of the disclosure, there is provision for the fusion filter used to be a Kalman filter. Kalman filters are fundamentally known and permit suitable merging of the recorded and calculated positions.

Further, there is preferably provision for a continuous differentiable modulo integrator to be used for the integration. What is known as the "continuous differentiable modulo integrator (CDMI)" permits estimation by means of integration taking into consideration particular settings that lead to a signal that is always derivable being obtained, and provides the user with the opportunity to decide for himself at what time a jump in the signal or in the position is meant to be permitted and when it is not.

In particular, there is provision for an estimate to be determined for the second position and bounded by a prescribable range of values. The effect achieved by the bounding is firstly that the output signal remains integrable and secondly that the output value is limited and cannot get out of hand.

According to a preferred development of the disclosure, there is provision for a strapdown algorithm to be used for performing the method. Said algorithm permits the described method to be implemented in an advantageous manner.

The apparatus according to the disclosure is distinguished by a specifically set up controller that performs the method according to the disclosure when used as intended.

The location determination system according to the disclosure, which has at least one satellite-protected navigation system for determining a first position and at least one inertial sensor for determining a second position of the motor vehicle, is distinguished by the apparatus according to the disclosure for determining the absolute position.

The motor vehicle according to the disclosure is distinguished by the location determination system according to the disclosure.

Further advantages and preferred features and combinations of features are obtained in particular from what is described above and from the claims.

BRIEF DESCRIPTION OF THE DRAWINGS

The disclosure will be explained in more detail below on the basis of the drawing, in which:

FIG. 4 shows a program for performing the method using a simplified depiction.

DETAILED DESCRIPTION

Figure 1:
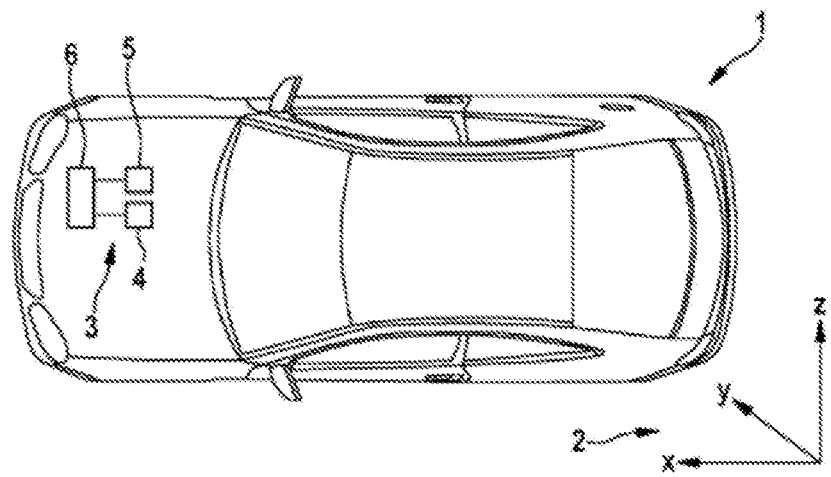
FIG. 1 shows a motor vehicle using a simplified depiction.

FIG. 1 uses a simplified depiction to show a motor vehicle 1 that moves within a global coordinate system 2. In order to determine the absolute position of the motor vehicle 1 within the coordinate system 2, the motor vehicle has a location determination system 3 that has a satellite-assisted navigation system 4 and one or more inertial sensors 5. The satellite-assisted navigation system 4 is used to measure a current first position of the motor vehicle 1 in the global coordinate system. As measurement of the position by means of the navigation system 4 is not possible at any time, however, additionally the at least one inertial sensor 5 is used to calculate a current second position of the motor vehicle. What is known as a strapdown algorithm uses in particular repeated integration of the measurement data of the inertial sensor 5, in particular of accelerations and rotation rates, to calculate the second position. The result of the integration is that the second position is derivable. This is important for control functions so that no jumps in the output signals arise that can easily lead to control instabilities. However, integration can also lead to smaller measurement errors or errors in the evaluation of the inertial data leading to ever increasing errors from the calculation of the second position as a result of erroneous reproduction and integration.

GNSS measurements by means of the navigation system 4 can limit these errors. However, these measurements are not always available. If the motor vehicle 1 travels through a tunnel, for example, then the navigation signal may not be available and a GNSS position measurement is not possible. This can lead to the position calculation by the strapdown algorithm increasing to a large error. When the GNSS measurement is then available again, the position jumps suddenly.

Figure 2:
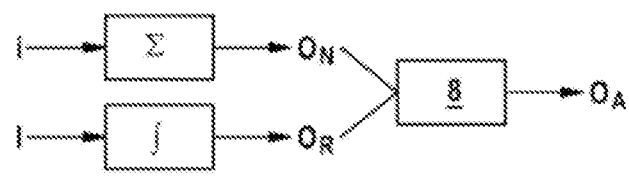
FIG. 2 shows a method for determining the absolute position of the motor vehicle.

In this regard, FIG. 2 uses a simplified manner to show a method for determining the absolute position 1. The starting point taken in this instance is a position value I recorded by the inertial sensor 5, which position value leads to the position value $O_R$ as a result of integration. At the same time—if available—the signal i of the navigation system 4 is used to determine the position $O_N$ of the motor vehicle 1. The measured position $O_N$ and the calculated position $O_R$, that is to say the first and second positions, are merged by a fusion filter 6 in order to determine the absolute position $O_A$.

In this case, it now becomes clear that if the position signal i of the navigation system 4 is not available and the first position, on account of a measurement error, leads to an ever greater deviation in the calculated second position $O_R$ from the actual position, the merging of the first or second position when the navigation signal i is recordable again can lead to a jump in the absolute position $O_A$.

To prevent this, there is provision for an error in the currently determined second position to be determined on the basis of a comparison of the most recently recorded first position with an associated calculated second position and taken into consideration for determining the current second position. This is meant to involve a Kalman filter being used as fusion filter and a continuous differentiable modulo integrator being used. This is discussed in more detail below:

First of all, the concept of the continuous differentiable modulo integrator (CDMI) will be presented using a simple integrator. The transfer for the real example is discussed later.

The physical system will first of all be described by means of the following equation:

$$p(t_x) = \int_0^{t_x} v(t)dt + p(t=0) \tag{1}$$

For the purpose of better illustration p(t) could be the position of the motor vehicle and v(t) could be its speed. The position p is obtained at any time $t_x$ from the position at the initial time $p(t=0)$ and the integrated speed v(t) since this initial time.

Let $v_k$ now be the measured and digitized value of the signal v(t) at the time $t=t_k$ for the system (1) [discrete values and times]. Let $e_{v_k}$ now be the total measurement error for this measurement. Thus, it holds that $$v_k = v(t_k) + e_{v_k} \tag{2}$$

Further, let $p_k$ be the measured and digitized value of the signal p(t) at the time $t=t_k$ for the system (1) [discrete values and times]. Let $e_{p_k}$ now be the total measurement error for this measurement. Thus, it holds that $$p_k = p(t_k) + e_{p_k} \tag{3}$$

Further, let k be integral and $k=[0 \ldots \infty]$. Without limiting the generality $v_k$ for every possible k available/measured but not $p_k$. That is to say that there is not a measurement for $p_k$ at any time. Further, for the sake of simplicity, let $t_k=0$ for $k=0$ and $t_k>t_{k-1}$. Likewise, let $p(0)=0$.

Integration permits an estimate $\tilde{p}_k$ to be determined for $p(t_k)$ from the various $v_k$. Equation (4) is a possible and simple in this regard:

integration scheme $$\tilde{p}_k = \sum_{j=0}^{k-1} v_j^*(t_{j+1}-t_j) = v_j^*(t_{j+1}-t_j) + \tilde{p}_{k-1} \text{ for } k>0 \tag{4}$$

Let two properties of $\tilde{p}_k$ now be shown/defined
1) $\tilde{p}_k$ is derivable. The definition $$\frac{\Delta \tilde{p}_k}{\Delta t} = \frac{\tilde{p}_k - \tilde{p}_{k-1}}{t_k - t_{k-1}}$$

results in the derivative of the estimate for $$\frac{\Delta \tilde{p}_k}{\Delta t} = v_{k-1} = v(t_{k-1}) + e_{v_{k-1}},$$

which corresponds precisely to the measured value. This means that the derivative of the estimate corresponds to the measured value of the derivative itself. That is to say apart from the measurement error $e_{v_k}$ the derivative corresponds of the real physical value.

2) $p_k$ is also derivable. For small $\Delta t = t_k - t_{k-1}$, it holds the $$\frac{\Delta p_k}{\Delta t} = \frac{p_k - p_{k-1}}{t_k - t_{k-1}} = \frac{p(t_k) - p(t_{k-1})}{t_k - t_{k-1}} + \frac{e_{p_k} - e_{p_{k-1}}}{t_k - t_{k-1}} = v(t_k) + \frac{e_{p_k} - e_{p_{k-1}}}{t_k - t_{k-1}}$$

is only dependent on the two measurement errors of p.

3) As a result of the measurement error $e_{v_k}$, the error between the estimate $\tilde{p}_k$ and the real value of $p(t_k)$ is unlimited. That is to say that real measurement errors $e_{v_k}$ (e.g. constant errors, randomly distributed errors, etc.) result in $\tilde{p}_k$ at some time becoming ever greater than any machine-representable value even if p(t) remains limited. In summary, $\tilde{p}_k$ is derivable but not limited.

Fusion filters allow various measurements of the same size to be combined. In the explanations hitherto, there is the estimate $\tilde{p}_k$ of p and the measured value $p_k$ itself. It can be assumed that the measured value $p_k$ is more accurate since the errors in the measured values $v_k$ add up for the calculation of $\tilde{p}_k$.

Subsequently, without limiting the generality, a simple filter, in particular a Kalman filter, will be used in order to calculate a fused estimate $\hat{p}_k$ of p from the measurements. If the measurement $p_k$ of p at the measurement point k is available, this will be used as an estimated magnitude $\hat{p}_k$ of p, and if no measurement is available, the measured values $v_k$ of v will be integrated from the last available measured value of p in order to ascertain $\hat{p}_k$. Let $X_k$ be the last measurement point before k at which $p_k$ was measured.

$$\hat{p}_k = \begin{cases} p_k & \text{if } p_k \text{ measured} \\ px_k + \tilde{p}_k - \tilde{p}_{X_k} = px_k + \sum_{j=X_k}^{k-1} v_j * (t_{j+1} - t_j) & \text{otherwise} \end{cases} \quad (5)$$

The following two properties will now be described for $\hat{p}_k$.

1) The derivative of $\hat{p}_k$ is not useful at the crossing points. If the same definition is used as above $$\frac{\Delta \hat{p}_k}{\Delta t} = \frac{\hat{p}_k - \hat{p}_{k-1}}{t_k - t_{k-1}}$$

and the simple example in which a measured value pk of p is available at the time k for the first time is considered, the following result is obtained for small $\Delta t = t_k - t_{k-1}$:

$$\frac{\Delta \hat{p}_k}{\Delta t} = \frac{\hat{p}_k - \hat{p}_{k-1}}{t_k - t_{k-1}} = \frac{p_k - \sum_{j=0}^{k-2} v_j * (t_{j+1} - t_j)}{t_k - t_{k-1}} =$$

$$\frac{p(t_k) + e_{v_{k-1}} - \sum_{j=0}^{k-2} v(t_j) * (t_{j+1} - t_j) - \sum_{j=0}^{k-2} e_{v_j} * (t_{j+1} - t_j)}{t_k - t_{k-1}} =$$

$$\frac{p(t_k) - \sum_{j=0}^{k-2} v(t_j) * (t_{j+1} - t_j)}{t_k - t_{k-1}} + \frac{e_{v_{k-1}} - \sum_{j=0}^{k-2} e_{v_j} * (t_{j+1} - t_j)}{t_k - t_{k-1}} =$$

$$v(t_k) + \frac{e_{v_{k-1}} - \sum_{j=0}^{k-2} e_{v_j} * (t_{j+1} - t_j)}{t_k - t_{k-1}}$$

All the measurement errors of $v_k$ have added up. The error in the derivative becomes large, and all the larger the longer the intervals between the measurements of $p_k$ and p are.

2) For finite times in which there is no measurement of p, $\hat{p}_k$ remains limited if p is also limited. The direct measured value of p allows the integrated measurement error in the measurements of v to be reduced again. In summary, $\hat{p}_k$ is therefore not derivable but limited at certain times.

There can be no solution that is derivable and also remains limited at any time. However, the concept described below can achieve the effect that the user of the signal has a derivable signal available for any period. The signal user can decide for himself at what times he permits a jump. Said jump is not dependent on the time at which a measurement of p is available and when a jump can be expected. The user has a fused signal at any time and can use a steady signal for any time interval.

Essentially two variables/values are used. The first value $pr_k$ is the derivable component of p. It corresponds in principle to the integrated estimate $\tilde{p}_k$.

$$pr_k = v_j^* (t_{j+1} - t_j) + pr_{k-1} \text{ for } k > 0 \quad (6)$$

In addition to this, a second value $ps_k$ is calculated that calculates/represents the error in the integrated estimate $\tilde{p}_k$ at the (most recently) measured value $p_k$. The following equation reproduces the calculation:

$$ps_k = \begin{cases} \tilde{p}_k - p_k & \text{if } p_k \text{ measured} \\ ps_{k-1} & \text{otherwise} \end{cases} \quad (7)$$

To solve the problem of $pr_k$ being unlimited, $pr_k$ is packed into a bounded range of values, the change being compensated for by means of correction of $ps_k$. Let the range of values be [0 $P_{max}$]. In this instance, let $P_{max}$ be chosen in the present case such that between two arbitrary measurement points k and k+1 the changes in p is small enough. The following condition will apply:

$$|\tilde{p}_k - \tilde{p}_{k-1}| < \frac{P_{max}}{2} \forall k \quad (8)$$

The following two operations are performed on the values until $pr_k$ is in the range of values. The packing is performed as follows:

if $pr_k < 0$ then $pr_k = pr_k + P_{max}$ and $ps_k = ps_k - P_{max}$ if $pr_k > p_{max}$ then $pr_k = pr_k - P_{max}$ and $ps_k = ps_k + p_{max}$ \quad (9)

$pr_k$ is no longer derivable as a result of this packing. However, $pr_k$ can be brought to a derivable magnitude by simple operations, since it is known that between $pr_k$ and $pr_{k-1}$ it is not possible for a jump that is larger than $P_{max}/2$ to arise without packing having taken place. On the basis of this property, the signal can be unpacked again ("unwrapping").

The use of the best value $po_k$ can be achieved by virtue of $pr_k$ and $ps_k$ being added. Assuming that $p_k$ is the most accurate value for p in each case, $po_k$ is the best estimate at any time.

$$po_k = pr_k + ps_k \quad (10)$$

The calculations have the following properties
1) $px_k$ is derivable like $\tilde{p}_k$.
2) Likewise, $\tilde{po}^{kx}_k = px_k + ps_{kx}$ is derivable for any fixed (but arbitrary) kx where kx≤k over all k and at the same time as the best derivable estimate. This means that the signal user can retain $ps_k$ at a value at any time and obtains derivable estimates for all subsequent values.

3) $pr_k$ is limited to a range of values

4) $po_k$ has the same properties as $\hat{p}_k$ and is limited (if p is limited) and not derivable.

The described method can thus be used to encode signals of a sensor with an appropriate property, to transmit them and to reverse the encoding again.

Figure 3:
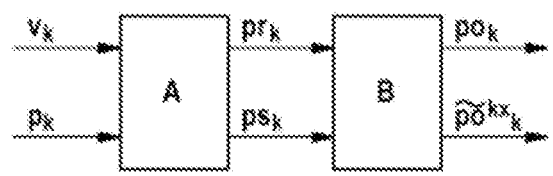
FIG. 3 shows a simplified depiction of a continuous differentiable modulo integrator.

In this regard, FIG. 3 uses a simplified depiction to show how the values $pr_k$ and $ps_k$ are transmitted. Both values are bounded if p is bounded. After the decryption, an optimum signal $po_k$ is at any time k and, for each time interval $[t_{k},t_k]$, a derivable signal $po^{k_x}_k$.

The simplified programming code shown in FIG. 4 combines the encoding A and decoding B described above. In this case, k0 is the time from which $po^{k_x}_k$ is derivable.

Fundamentally, the described method can be applied to both sensors with one or more measured variables compliant with the physical model according to equation (1). An explicit instance of application is the previously described strapdown algorithm, from which any number of its integrators are replaced by the depicted CDMI method. The communication between sensor and user can be a pure software-based digital interface or else any type of communication between a physical interface (for example SPI, CAN, Ethernet, etc.).

Optionally, $ps_k$ is transmitted only when it changes. This can save bandwidth. Additionally, pk and $v_k$ can also be variables fused or averaged from multiple further measured variables. It is important that the integral relationship according to equation (1) applies between the represented physical variables. Instead of the simple integration in equations (4) and (6), it is also possible to use more accurate indication schemes, such as, for example, trapezoidal integration, integration over multiple interpolation points or the like.

The invention claimed is:

1. A method for determining the absolute position of a motor vehicle in a global coordinate system, comprising:
   determining a first position with a satellite-assisted navigation system;
   determining a second position with at least one inertial sensor by integrating measured values of the at least one inertial sensor, wherein a continuous differentiable modulo integrator is used for the integration such that the second position corresponds to an integrated estimate bounded by a prescribable range of values;
   taking the first position and the second position as a basis for ascertaining the absolute position of the motor vehicle using a fusion filter;
   determining an error in a currently determined second position based on a comparison of a most recently recorded first position with an associated second position; and
   determining the currently determined second position based on the determined error.

2. The method as claimed in claim 1, further comprising:
   determining the error as a difference between the most recently recorded first position and the associated second position.

3. The method as claimed in claim 1, further comprising:
   choosing the associated second position as the second position that was ascertained at the same time as the most recently recorded first position.

4. The method as claimed in claim 1, wherein the fusion filter used is a Kalman filter.

5. The method as claimed in claim 1, further comprising:
   using a strapdown algorithm for performing the method.

6. An apparatus for determining the absolute position of a motor vehicle, comprising:
   at least one satellite-assisted navigation system configured to determine a first position;
   at least one inertial sensor configured to determine measured values based on a second position; and
   a controller configured to determine the absolute position by recording the first position, calculating the second position by integrating the measured values, taking the first position and the second position as a basis for ascertaining the absolute position of the motor vehicle using a fusion filter, determining an error in a currently determined second position based on a comparison of a most recently recorded first position with an associated second position, and determining the currently determined second position based on the determined error,
   wherein the controller is configured to use a continuous differentiable modulo integrator for the integration such that the second position corresponds to an integrated estimate bounded by a prescribable range of values.

7. The apparatus of claim 6, wherein the apparatus is included in a location determination system of the motor vehicle.

8. A motor vehicle, comprising:
   a location determination system including
      at least one satellite-assisted navigation system configured to determine a first position,
      at least one inertial sensor configured to determine measured values based on a second position, and
      a controller configured to determine the absolute position by recording the first position, calculating the second position by integrating the measured values, taking the first position and the second position as a basis for ascertaining the absolute position of the motor vehicle using a fusion filter, determining an error in a currently determined second position based on a comparison of a most recently recorded first position with an associated second position, and determining the currently determined second position based on the determined error,
   wherein the controller is configured to use a continuous differentiable modulo integrator for the integration such that the second position corresponds to an integrated estimate bounded by a prescribable range of values.

* * * * *